(12) United States Patent
McLeod

(10) Patent No.: US 6,345,644 B1
(45) Date of Patent: Feb. 12, 2002

(54) DEVICE FOR PREVENTING PIPELINE FREEZING

(76) Inventor: Cora Marguerite McLeod, Box 41, Bassano, Alberta (CA), T0J 0B0

( * ) Notice: Subject to any disclaimer, the term of this patent is extended or adjusted under 35 U.S.C. 154(b) by 0 days.

(21) Appl. No.: 09/699,627

(22) Filed: Oct. 31, 2000

(51) Int. Cl.$^7$ ................................................ F17D 1/14
(52) U.S. Cl. .................... 137/340; 137/13; 137/563; 137/565.37
(58) Field of Search .............................. 137/340, 899, 137/13, 563, 565.17, 565.37

(56) References Cited

U.S. PATENT DOCUMENTS

| | | | | |
|---|---|---|---|---|
| 3,735,769 A | * | 5/1973 | Miller ........................... 137/13 |
| 3,756,268 A | * | 9/1973 | Lefever et al. .............. 137/340 |
| 4,191,348 A | * | 3/1980 | Holwerda ................ 244/134 C |
| 4,425,936 A | * | 1/1984 | Goss ........................... 137/340 |
| 4,531,538 A | * | 7/1985 | Sandt et al. ................. 137/334 |
| 5,027,842 A | * | 7/1991 | Powers ........................... 137/1 |

* cited by examiner

Primary Examiner—A. Michael Chambers
(74) Attorney, Agent, or Firm—I. Zborovsky

(57) ABSTRACT

A device for preventing freezing of a pipeline has a pipe bringable into contact with the pipeline and having a supply branch and a return branch, a container for accommodating a heating medium, a unit for supplying the heating medium into the supply branch and returning the medium from the return branch back into the container, and a heating unit for heating the container and therefore the heating medium so that the heated medium is supplied from the container into the supply branch, transfers heat to the pipeline and returns through the return branch back into the container for further reheating.

11 Claims, 2 Drawing Sheets

DEVICE FOR PREVENTING PIPELINE FREEZING

BACKGROUND OF THE INVENTION

The present invention relates to a device for preventing freezing of pipelines. More specifically, it relates to a device for preventing freezing of pipelines which carry fluids such as petroleum, though there may be agricultural applications as well.

Traditionally when a petroleum or compressed gas pipeline freezes, the pipeline company will employ services of a "steam truck". The crew will attend the site and use steam to thaw the lines. This method however will not prevent the subsequent re-freezing of the pipeline. In addition, this method has environmental drawbacks as the equipment moves over the ground near the pipelines.

SUMMARY OF THE INVENTION

Accordingly, it is an object of present invention to provide a device for preventing freezing of pipelines which avoids the disadvantages of the prior art.

In keeping with these objects and with others which will become apparent hereinafter, one feature of present invention resides, briefly stated, in a device for preventing freezing of a pipeline which has a pipe bringable into contact with the pipeline and having a heating medium supply branch and a heating medium return branch; a container for accommodating a heating medium; means for supplying the heating medium into said supply branch and returning the heating medium from said return branch back into said container; and heating means for heating said container and therefore said heating medium so that the heated medium is supplied from said container into the supply branch, transfer heat to the pipeline and the medium in it, and returns through the return branch back into the container for further re-heating.

In accordance with another feature of the present invention said heating medium supply and return means include a pump.

In accordance with another feature of the present invention, the heater has a line connectable with a fuel supply which fuels said heater. In accordance with another feature of the present invention, the pump also has a fuel supply which supplies fuel to the pump for operating the pump.

In accordance with another feature of the present invention, a fuel supply line which supplies fuel to the heater for operation of the heater also supplies fuel to the pump for operation of the pump.

In accordance with another feature of the present invention, the container is provided with a drip tray for collecting drips of heating medium.

In accordance with another feature of the present invention, means is provided, for holding the heating medium supply and return pipe on the pipeline. The holding means includes means for wrapping around the heating medium supply and return pipe together with the pipeline when the pipe is arranged on the pipeline, so as to provide simultaneously a heat insulation.

In accordance with another feature of the present invention, a housing accommodates said container, the heater, and the pump, so that the device includes two components, namely one component formed as the housing with the container, the heater and the pump, and another component formed as the pipe with the heating medium supply branch and return branch.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
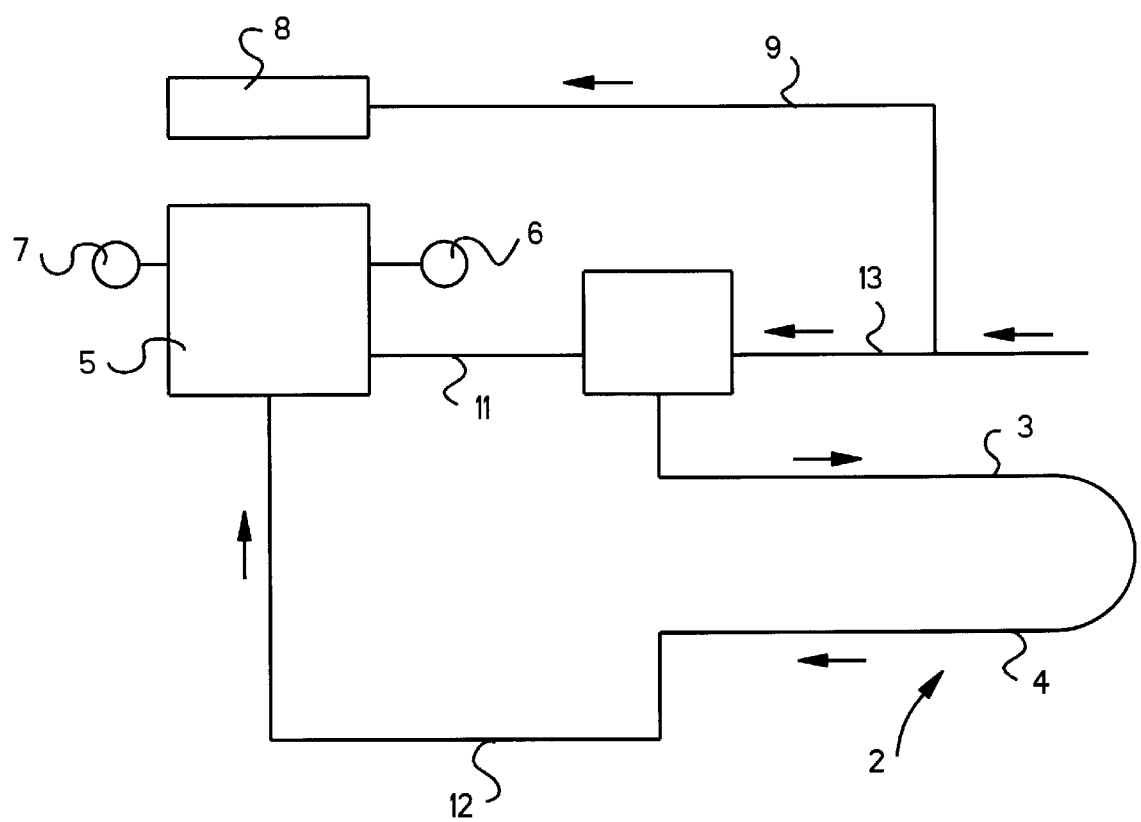
FIG. 1 is a view schematically showing a device for preventing freezing of a pipeline in accordance with the present invention.
Figure 2:
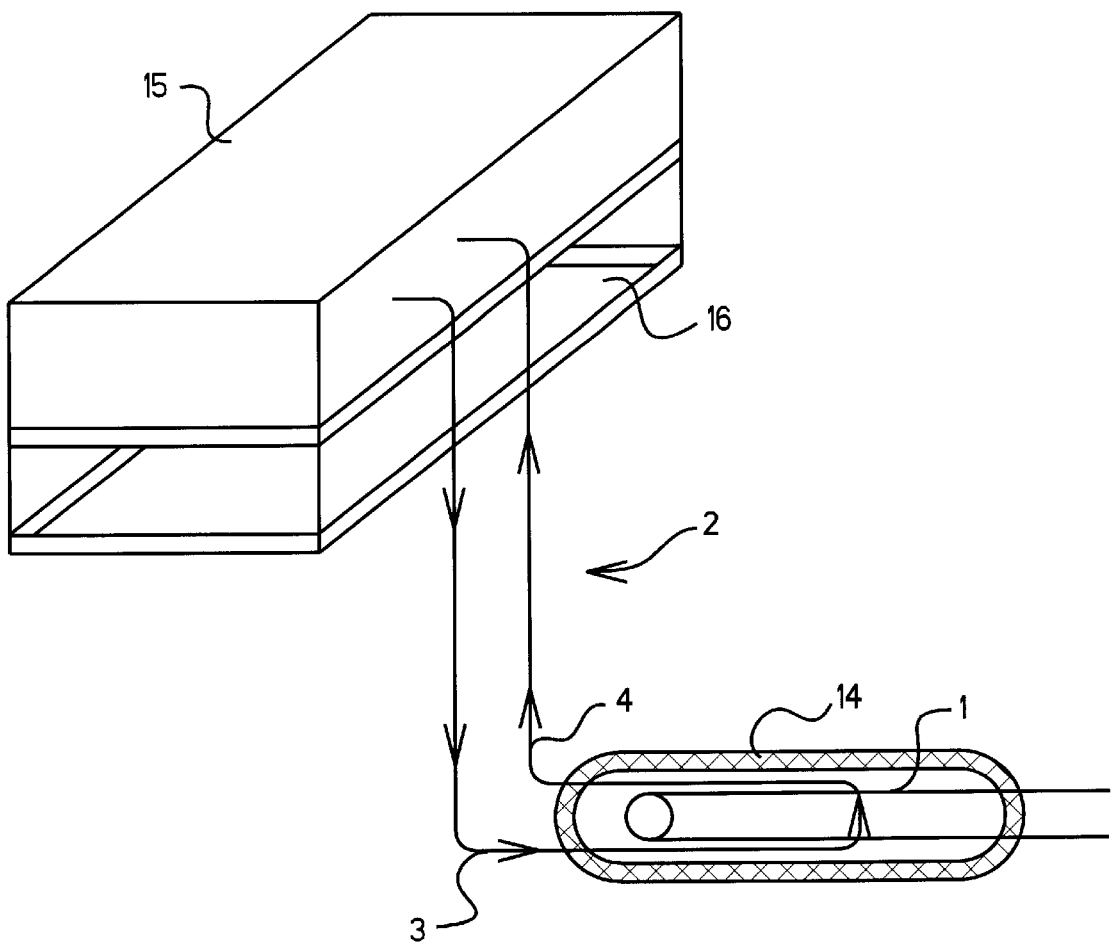
FIG. 2 is a view showing two main components of a device in perspective.

A device for preventing freezing of a pipeline which is identified with reference numeral 1 includes a pipe for circulation of a heating medium, such as glycol mixture which is identified with reference numeral 2. The pipe has a heating medium supply branch 3 and a heating medium return branch 4. The heating medium is supplied through the supply branch 3 which is in direct contact with a wall of the pipeline to be heated 1, transfers heat to the pipeline to be heated, prevents its freezing or unfreezes it, and is returned through the return branch 4.

The device is provided with a container for storing the heating medium which is identified with reference numeral 5 and formed as a tank composed for example of aluminum and provided with a venting cap. It is filled with a heating medium such as glycol mixture. A temperature indicator 6 indicates a temperature of the glycol mixture in the tank, and a level indicator 7 indicates a level of the glycol mixture in the tank. A heater 8 is provided for heating the glycol mixture in the tank 5. The heater 8 can be formed as a flameless heater operating for example by contact of a heating element of the heater 8 with the wall of the tank 5. The heater 8 is supplied with a fuel, for example fuel gas through a fuel supply line 9. A pump 10 is provided for aspirating the glycol mixture from the tank 5 and pumping it into the heating medium supply branch 3, and then through the heating medium return branch 4 back to the tank 5. The aspiration of the glycol mixture from the tank 5 is performed through a connecting pipe 11 between the tank 5 and the pump 10, and the return of the glycol mixture from the return branch 4 into the tank 5 is performed through an intermediate pipe 12. As can be seen from the drawings, a pump 10 is provided with the fuel supply line 13 for supplying fuel, such as fuel gas, for operation of the pump. The fuel for operation of the heater and the pump can be taken from the pipeline.

The device operates in the following manner. The heater 8 heats the tank 5 and the glycol mixture in the tank, the pump 10 pumps the heated glycol mixture through the heating medium supply branch 3 which transfers heat to the pipeline 1 and to the medium in it to prevent freezing or unfreeze the medium, and then is returned through heating medium return branch 4 back into the tank. It is to be understood that the heat is also transferred from the heated glycol mixture in the return branch of the pipeline. An insulation 14 surrounds the pipe 2, in particular its branches 3 and 4, and the pipeline 1 and as to hold the pipe 2 or the pipeline 1 or to reduce heat losses.

In accordance with the present invention, the components of the device are arranged so that the device actually includes two main parts. One of the parts is a housing 15 which accommodates the tank 5, the pump 10 with the lines 11 and 13, the heater 8 with the line 9, and the line 12. The second part of the device is the heating medium circulating pipe 2 with the branches 3 and 4 which are partially introduced in the housing. Therefore the device is formed very compact and convenient for operation.

The tank can be provided with a drip tray which is identified with reference numeral 16, to collect dripping glycol mixture.

It will be understood that each of the elements described above, or two or more together, may also find a useful application in other types of constructions differing from the types described above.

While the invention has been illustrated and described as embodied in device for preventing pipeline freeze, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A device for preventing freezing a fluid in a pipeline, comprising a container for accommodating a heating medium; heating means for heating said container and said heating medium in said container; a pipe bringable into contact with the pipeline and having a heating medium supply branch for supplying the heating medium from said container and a heating medium return branch for returning the heating medium to said container; means for supplying the heating medium into said supply branch from said container and returning the medium from said return branch back into said container, said heating medium supply branch and said heating medium return branch being formed so that at least one of said branches is in direct heat-transmitting contact with a wall of the pipeline; means for holding said at least one branch of said pipe in direct heat-transmitting contact with the wall of the pipeline so that heat is transmitted from the heating medium in said at least one branch directly through the wall of the pipeline to the fluid in the pipeline so as to heat the fluid in the pipeline.

2. A device as defined in claim 1, wherein said heating medium supply and return means include a pump.

3. A device as defined in claim 2, wherein said pump has a fuel supply which supplies fuel to said pump for operating of said pump.

4. A device as defined in claim 2; and further comprising a fuel supply line which supplies fuel to said heater for operation of said heater and also supplies fuel to said pump for operation of said pump.

5. A device as defined in claim 1, wherein said heater has a line connectable with a fuel supply which fuels said heater.

6. A device as defined in claim 1, wherein said container is provided with a drip tray for collecting drips of said heating medium.

7. A device as defined in claim 1, wherein said holding means includes means for wrapping around said at least one branch, which is in heat-transmitting contact with the pipeline, together with the pipeline, so as to provide simultaneously a heat insulation.

8. A device as defined in claim 1; and further comprising means for indicating a level of said heating medium in said container.

9. A device as defined in claim 1; and further comprising means for indicating temperature of said heating medium in said container.

10. A device as defined in claim 1; and further comprising a housing accommodating said container, said heating means and said supply and return means, so that the device includes two components, with one component formed as said housing with said container, said heating means and said pipe and another component formed as said supply and return means with said heating medium supply branch and said heating medium return branch.

11. A device as defined in claim 1, wherein said heating medium supply branch and said heating medium return branch are formed so that the other of said branches is also in direct heat-transmitting contact with the wall of the pipeline, said holding means holding said other branch in direct heat-transmitting contact with the wall of the pipeline so that heat is transmitted from the heating medium in said other branch through the wall of the pipeline to the fluid in the pipeline.

* * * * *